United States Patent
Schu

(10) Patent No.: US 7,966,977 B2
(45) Date of Patent: Jun. 28, 2011

(54) METHOD AND DEVICE FOR THE PRODUCTION OF SUPERHEATED STEAM

(75) Inventor: Reinhard Schu, Walkenried (DE)

(73) Assignee: Ecoenergy Gesellschft fur Energie -Und Umwelttichnik mbH, Walkenried (DE)

( * ) Notice: Subject to any disclaimer, the term of this patent is extended or adjusted under 35 U.S.C. 154(b) by 552 days.

(21) Appl. No.: 11/989,312

(22) PCT Filed: May 23, 2006

(86) PCT No.: PCT/DE2006/000885
§ 371 (c)(1),
(2), (4) Date: Jan. 23, 2008

(87) PCT Pub. No.: WO2007/014538
PCT Pub. Date: Feb. 8, 2007

(65) Prior Publication Data
US 2009/0077971 A1    Mar. 26, 2009

(30) Foreign Application Priority Data
Aug. 2, 2005    (DE) .......................... 10 2005 036 792

(51) Int. Cl.
*F22G 1/00* (2006.01)

(52) U.S. Cl. .................... 122/479.1; 122/36; 122/479.6; 122/460

(58) Field of Classification Search .................... 122/36, 122/481, 484, 485, 486, 487, 479.1, 479.6, 122/460, 470
See application file for complete search history.

(56) References Cited

U.S. PATENT DOCUMENTS

| | | | |
|---|---|---|---|
| 1,738,890 A * | 12/1929 | Goodrich | 122/484 |
| 3,020,894 A * | 2/1962 | Rowand | 122/33 |
| 4,241,701 A * | 12/1980 | Morse | 122/460 |
| 4,887,431 A * | 12/1989 | Peet | 60/667 |
| 5,605,118 A * | 2/1997 | Sinn et al. | 122/479.1 |
| 6,237,542 B1 * | 5/2001 | Nakajo et al. | 122/7 R |
| 2007/0245736 A1 * | 10/2007 | Barnicki | 60/670 |

FOREIGN PATENT DOCUMENTS

| | | | |
|---|---|---|---|
| DE | 1904638 | * | 8/1970 |
| EP | 0 593 999 | | 4/1994 |
| FR | 2283524 | * | 3/1976 |
| GB | 1 260 131 | | 1/1972 |
| WO | WO 9500804 A1 * | | 1/1995 |

* cited by examiner

Primary Examiner — Gregory A Wilson
(74) Attorney, Agent, or Firm — Andrew Wilford

(57) ABSTRACT

The invention relates to a method and an apparatus for the generation of superheated steam. According to the invention, essentially saturated or wet steam is generated in a main vessel in which superheating is technically not possible or only restrictedly possible and which is superheated in an auxiliary plant whereby the superheater of the auxiliary plant is controlled dependent upon the steam production of the main plant.

10 Claims, 1 Drawing Sheet

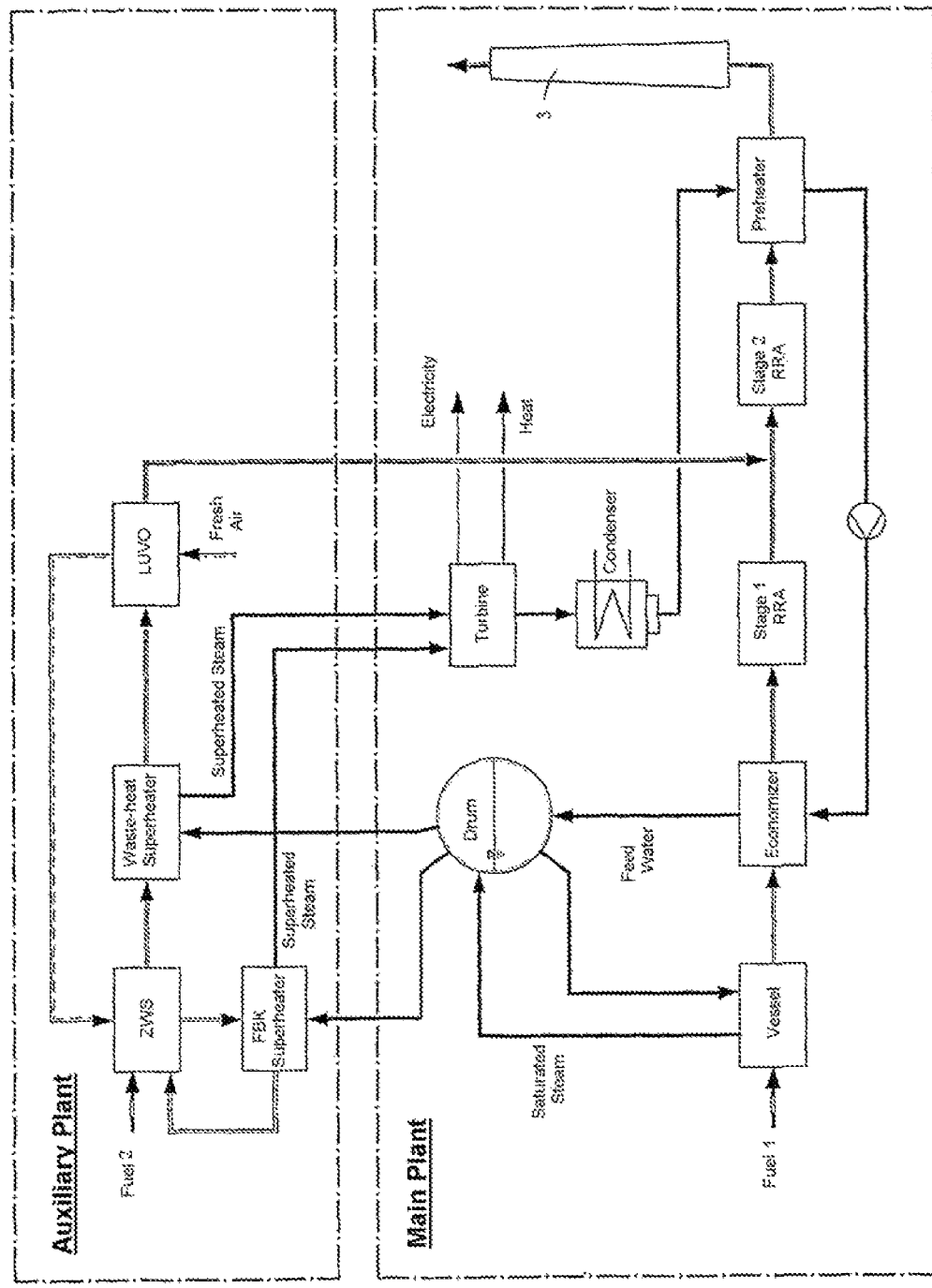

US 7,966,977 B2

METHOD AND DEVICE FOR THE PRODUCTION OF SUPERHEATED STEAM

CROSS REFERENCE TO RELATED APPLICATIONS

This application is the US national phase of PCT application PCT/DE2006/000885, filed 23 May 2006, published 8 Feb. 2007 as WO2007/014538, and claiming the priority of German patent application 102005036792.5 itself filed 2 Aug. 2005, whose entire disclosures are herewith incorporated by reference.

FIELD OF THE INVENTION

The present invention relates in particular to substitute fuel utilization and waste incinerator plants. Substitute fuels are understood to mean all fuels whose flue gas has components that are corrosive for the boiler and downstream plant components and/or that tend toward slagging. These are, for example, compounds containing chlorine and sulphur and/or low-melting-point ash that can have, for example, a high alkali content.

BACKGROUND OF THE INVENTION

During the operation of waste incinerators the safe and reliable disposal of refuse and hazardous waste stands above all in the foreground. At first, attempts have been made to limit the emission of hazardous materials to avoid environmental damage. The increasing world-wide scarcity of energy reserves has finally led to consideration being given to utilizing the calorific value of incinerator feedstock as well as to optimizing the energy efficiency of the processes.

Most substitute fuel incinerators were hitherto equipped with boilers for making medium pressure steam (up to 60-bar). The need to limit pressure comes from the high-temperature corrosion increasingly taking place at steam temperatures above 370° C. to 400° C. with the materials employed. High-temperature corrosion can result in the steam superheaters having to be replaced after a short operation time of 3 to 12 months. So that the steam produced can also be sufficiently superheated the steam pressure must be limited to a maximum of 40 to 60 bar in such plants.

DE 19 15 852 [GB 1 260 131] describes a method in which a waste boiler produces saturated steam that is further superheated in a main boiler fired by fossil fuel together with the saturated steam of the main boiler that is also equipped with a vaporizer. Depending only upon steam pressure and steam temperature only ca. 15% to 40% of the combustion thermal output of the main boiler is required for the simple superheating of saturated steam from a substitute fuel plant. However, in the document cited a complete power plant with vaporizer is provided for superheating the saturated steam produced in the substitute fuel plant, a consequence of which is that the superheating plant is not connected as auxiliary plant to increase the energy efficiency, but as a main plant, which itself must be considerably larger than the substitute fuel plant.

A method is described in EP 0 593 999 A1 in which a vaporizer fitted in the boiler of an incinerator is charged with feed water by means of which high pressure steam is generated as saturated steam or wet steam that is passed out of the boiler and superheated in an external superheater and then transferred to a high pressure steam turbine for power generation. However, the method of steam superheating and the fuel used are not described in this document. In particular, the problem of the relationship between evaporator surfaces in the combustion plant and the superheater surfaces that serve as external superheater is not discussed.

From the publication "Studie zum Energiepotential von KVA in der Schweiz, Baudirektion Kanton Zürich, AWEL, Amt für Abfall, Wasser, Energie and Luft" of June 2005, the waste incinerator HR-AVI Amsterdam, Netherlands, currently under construction is described. When operational this plant will have a net electrical efficiency of 30%. The efficiency will be obtained by employing different measures for increasing the efficiency of the boiler and the measures detailed in the following for increasing the turbine thermal efficiency compared to waste incinerators currently operated:
    reduction of the condensation pressure,
    superheating of live steam to 440° C.,
    live steam pressure of 130 bar,
    reheating with live steam as is common practice in nuclear power plants,
    multistage condensate preheating.

The investment costs for the efficiency-optimized Project HR-AVI with 30% net electrical efficiency are ca. 20%-30% above the costs of conventional waste incinerators with 22%-26% net electrical efficiency. Owing to the optimization a very considerable increase in superheater corrosion is expected so that the corresponding crane installation for rapid exchange of the superheater bundle as an expendable part has been taken into consideration. The increased live steam temperature and the reheating have provided the greatest part of the measures for the increase in efficiency opposite conventional incinerator plants, that are, however, utilized fully with the measures specified in this publication.

For technical reasons nuclear power plants with moderator water as pressurized water or boiling water reactors cannot carry out any significant live steam superheating with the energy from nuclear fission. Only reheating with live steam can be carried out. However, with entire steam generation plants as external superheaters for nuclear power plants the energy fraction remaining for external superheating of saturated steam is so low that complete large scale power plants of dimensions comparable to the nuclear plant itself would be necessary.

OBJECT OF THE INVENTION

The object of the present invention is to provide efficient superheating of saturated steam from substitute fuel incinerators or nuclear power plants with the object of increasing electrical efficiency.

SUMMARY OF THE INVENTION

According to the invention the saturated or wet steam taken from a first stage, the main plant, is transferred to a second stage, the auxiliary plant, and there superheated, the steam superheating being controlled depending on the steam production of the first stage. By separation of the production of the saturated steam with high pressure, mainly in the main plant, and superheating of the saturated steam that is mainly carried out in the auxiliary plant a series of advantageous over the state of the art are achieved. In the first stage preferably waste, biomass or substitute fuel are incinerated when water is evaporated by the heat produced. The auxiliary plant is, according to the invention, preferably operated with a fuel from which flue gas is produced with only low corrosion and slagging potential.

According to an embodiment of the invention the auxiliary plant is operated as circulating fluidized bed combustion (ZWS) with fluidized bed heat exchanger (FBK). The combination of the two combustion plants with different fuels takes place through a circulating medium, preferably water. According to the invention the main and auxiliary plants are connected with one another by a water-steam circulation. This thermal coupling between the main plant as evaporator and the auxiliary plant as external superheater has the advantage over the hitherto known methods that the auxiliary plant serving as superheater can be operated without significant evaporator fraction and the investment costs and fuel costs for the higher-quality fuel of the auxiliary plant are minimized in comparison to the main plant. The coupling of the two plants according to the invention has furthermore the advantage that load fluctuations in steam generation caused by the normally poorly meterable heterogeneous fuel of the main plant can be regulated through the good metering of the homogeneous fuel of the auxiliary plant so that the inlet temperature of the live steam and of the superheated steam to the steam turbines can be regulated according to the demands of the steam turbines, as a result of which wear of the turbines by temperature stress can be minimized and automated operation simplified.

Main plants, according to the meaning of the present invention, are substitute fuel utilization plants, waste incinerators and biomass incinerators with biomass that contain corrosive or ash melting point-lowering components in the flue gas. Furthermore, the main plants can also be nuclear power plants, pressurized water or boiling water reactors that because of the moderator water do not allow significant steam superheating.

The circulating fluidized bed combustion with the fluidized-bed heat exchanger essentially does not require an evaporation component. Dependent on technology the temperatures of the circulating fluidized bed combustion are below 900° C. in all areas. According to another development of the invention the firebox does not operate as a cooled reactor, rather more cooling of the furnace takes place indirectly by the recycled and cooled circulation ashes returned from the fluidized-bed heat exchanger. The fluidized-bed heat exchanger is operated as a superheater, whereby the heat transfer in the fluidized-bed heat exchanger as a solid bed steam superheater is significantly more efficient than in the case of conventional flue gas steam superheaters. In this way lower heat exchange sizes and investment costs ensue.

As is known principally from the state of the art, primary air is added as fluidization agent to the fluidized-bed heat exchanger, through which the risk of corrosion damage is correspondingly reduced, even with the low corrosive flue gases of the auxiliary plant. By the input of fluidization air in the region of the ash input into the fluidized-bed heat exchanger the ash is cooled so far that the temperatures of the superheater in the fluidized-bed heat exchanger can be adjusted to the material properties. In the highly efficient fluidized-bed heat exchanger as superheater and reheater ca. 60% to 85% of the superheating energy required for superheating and reheating of the saturated steam can be supplied, depending on the fuel of the auxiliary plant. Lignite, coal, natural gas or oil can be used as fuel for the auxiliary plant, as well as other fuels with low corrosion and slagging potential as long as adequate homogeneity is available.

The flue gas from the circulating fluidized bed combustion enters the waste heat superheater at temperatures of 850° C. to 900° C. Depending on the fuel and the choice of materials of the superheater bundle, reheaters can preferably be used at these temperatures. Provided the temperature before superheating has to be lowered to <800° C., this takes place by flue gas recirculation, upstream economizers or evaporators. With good fuel and appropriate selection of material this is not necessary with reheaters at pressures of 15 to 40 bar directly after the high pressure part of the turbines. Through the absence of the economizer, which is located in the main plant, an air preheater is necessary after cooling by the waste heat superheater in order to cool the flue gases to temperatures below 200° C. The preheated primary air enters the circulating fluidized bed combustion and thus raises the adiabatic combustion temperature, as a result of which the heat fraction of the fluidized-bed heat exchanger to be transferred is increased.

According to a further embodiment of the invention, two fluidized-bed heat exchangers are used in the auxiliary plant, of which one is used for superheating, and the other for feed water preheating and evaporation in the case of a failure of the main plant, as start-up boiler and/or regulating variable The flue gas from the auxiliary plant is preferably purified together at least in part with the flue gas from the main plant and discharged through a common chimney.

As mentioned above, when carrying out the method an apparatus is used with which the saturated or wet steam generated in a main plant is fed into a steam generator drum and from there transferred into a separate controllable auxiliary plant that has a device for circulating fluidized bed combustion with fluidized bed cooling. In addition to live steam superheating, the auxiliary plant is provide with a further waste heat superheater for reheating, whereby the superheater (s) of the auxiliary plant is/are connected with a turbine for power generation.

BRIEF DESCRIPTION OF THE DRAWING

Further embodiments of the invention and the advantages thus achievable are explained with the diagrammatic sole FIGURE of the drawing that schematically represents the construction of the apparatus.

SPECIFIC DESCRIPTION

As can be seen from the drawing, different respective fuels 1 and 2 are used in the main plant and in the auxiliary plant. The coupling of the two plants takes place through a drum for steam production into which saturated steam produced in the main plant is transferred and from which it is fed into the auxiliary plant where it is superheated. The saturated steam that collects in the drum is produced in the vessel or boiler of the main plant that is fired with the fuel 1. The required feed water is preheated in the economizer through the flue gas produced and transferred into the steam drum. The flue gas from the boiler then passes through the first stage of a flue gas purification plant (RRA), which can consist of, for example, a spray scrubber with attached lime slaking plant The flue gas is transferred from the first stage of the flue gas purification plant RRA into the second stage of the flue gas purification plant RRA whereby, according to the diagram, the flue gas of the auxiliary plant is added and purified in the second stage. In this stage additives for example for flue gas purification can be added, for example Ca(OH)2/HOK, and particles are removed from the flue gas. After the second stage the residual heat and in part condensation heat of the flue gas is used in a condensate preheater before the flue gas is released into the atmosphere through a chimney 3. The flue gas can also be further cooled in a primary air preheater for the main plant and the efficiency of the boiler increased. The resulting condensate water can be used for flue gas purification and/or as inflow for feed water treatment.

The wet steam or saturated steam is fed from the drum into the auxiliary plant in which fuel 2 is combusted in a circulating fluidized bed (ZWS). The heat formed is transferred to the saturated steam from the main plant by the fluidized-bed heat exchanger (FBK-superheater) and the waste heat superheater. The steam thus superheated is fed to the turbine for power generation. The condensate is returned to the feed water pump through the above-mentioned preheater. In order to be able to treat the flue gas from the auxiliary plant in the second stage the flue gas must be cooled, for which an air preheater (LUVO) is used, which preheats the combustion air of the fluidized-bed combuster ZWS.

The invention claimed is:

1. A system for making superheated steam, the system comprising:
   a main plant having a drum for making saturated high-pressure steam;
   an auxiliary plant;
   means for transferring the saturated high-pressure steam to an auxiliary plant; and
   means in the auxiliary plant for superheating the saturated or wet steam in the auxiliary plant by circulating fluidized-bed combustion or gasification with heat transfer with solid particles of the fluidized bed; and
   two fluidized-bed heat exchangers of which one is used for superheating and the other for evaporation including feed water preheating in the case of failure of the main plant, as a start-up boiler and regulating variable.

2. The system according to claim 1, further comprising
   a turbine connected to the fluidized-bed and means for superheating of the auxiliary plant.

3. A method of making superheated steam, the method comprising the steps of sequentially:
   making saturated high-pressure steam in a main plant;
   transferring the saturated high-pressure steam to an auxiliary plant;
   superheating the saturated or wet steam in the auxiliary plant by circulating fluidized-bed combustion or gasification with heat transfer with solid particles of the fluidized bed and by low-pressure heat exchange with flue gas in a waste-heat superheater; and
   further cooling the flue gases in the auxiliary plant by an air preheater.

4. A method of making superheated steam, the method comprising the steps of sequentially:
   making saturated high-pressure steam in a main plant;
   transferring the saturated high-pressure steam to an auxiliary plant;
   superheating the saturated or wet steam in the auxiliary plant by circulating fluidized-bed combustion or gasification with heat transfer with solid particles of the fluidized bed and by low-pressure heat exchange with flue gas in a waste-heat superheater;
   cooling the flue gas to the water dew point by condensate preheating to produce condensate water; and
   using the resultant condensate water for flue gas cleaning or as input for feed water treatment.

5. A method for making superheated steam, the method comprising the steps of sequentially:
   incinerating waste biomass or substitute fuel in a main plant such that heat is released to heat and evaporate water and make saturated high-pressure steam in the main plant;
   transferring the saturated high-pressure steam to an auxiliary plant; and
   combusting particles of coal in a fluidized bed in the auxiliary plant to the saturated or wet steam in the auxiliary plant by circulating fluidized-bed combustion or gasification with heat transfer with solid particles of the fluidized bed and by low-pressure heat exchange with flue gas in a waste-heat superheater.

6. The method according to claim 5 wherein the main and auxiliary plants are coupled with one another by a circulating medium.

7. The method according to claim 5 wherein the circulating bed material is cooled indirectly mainly with steam.

8. The method according to claim 5 wherein the flue gases from the auxiliary plant are at least in part purified together with the flue gases from the main plant and released through a chimney.

9. The method according to claim 5 wherein in addition to the superheating of the primary steam at least one reheating is carried out in the auxiliary plant.

10. The method according to claim 5 wherein flue gas temperatures of at most 900° C. for superheating are produced in the auxiliary plant by flue gas circulation.

* * * * *